(12) United States Patent
Osman Oguz

(10) Patent No.: US 9,616,363 B2
(45) Date of Patent: Apr. 11, 2017

(54) FILTRATION ASSEMBLY FOR GRADUALLY SCREENING OF FINE AND COARSE PARTICLES IN A SINGLE OPERATIONAL UNIT

(71) Applicant: ANTEL ARITMA TESISLERI INSAAT SANAYI VE TICARET AS, Istanbul (TR)

(72) Inventor: Tameroglu Osman Oguz, Istanbul (TR)

(73) Assignee: Antel Aritma Tesisleri Insaat Sanayi VeTicaret A.S., Istanbul (TR)

( * ) Notice: Subject to any disclaimer, the term of this patent is extended or adjusted under 35 U.S.C. 154(b) by 0 days.

(21) Appl. No.: 15/122,029

(22) PCT Filed: Feb. 27, 2015

(86) PCT No.: PCT/TR2015/000079
§ 371 (c)(1),
(2) Date: Aug. 26, 2016

(87) PCT Pub. No.: WO2015/130253
PCT Pub. Date: Sep. 3, 2015

(65) Prior Publication Data
US 2017/0014736 A1   Jan. 19, 2017

(30) Foreign Application Priority Data
Feb. 28, 2014   (TR) .................................. 2014 02379

(51) Int. Cl.
| | | |
|---|---|---|
| B01D 29/64 | (2006.01) | |
| B01D 29/23 | (2006.01) | |
| B01D 29/58 | (2006.01) | |
| B01D 29/60 | (2006.01) | |
| B01D 29/94 | (2006.01) | |
| B01D 35/02 | (2006.01) | |
| C02F 1/00 | (2006.01) | |

(52) U.S. Cl.
CPC ............ *B01D 29/643* (2013.01); *B01D 29/23* (2013.01); *B01D 29/58* (2013.01); *B01D 29/606* (2013.01); *B01D 29/6461* (2013.01); *B01D 29/94* (2013.01); *B01D 35/02* (2013.01); *C02F 1/001* (2013.01); *C02F 2209/03* (2013.01); *C02F 2303/16* (2013.01); *C02F 2303/24* (2013.01)

(58) Field of Classification Search
None
See application file for complete search history.

(56) References Cited

FOREIGN PATENT DOCUMENTS

| AT | 513225 A2 | 2/2014 |
|---|---|---|
| DE | 935424 C1 | 11/1955 |

(Continued)

OTHER PUBLICATIONS

International Search Report, PCT/TR2015/000079, date of mailing Aug. 14, 2015 (4 pages).

(Continued)

*Primary Examiner* — Terry Cecil
(74) *Attorney, Agent, or Firm* — Nixon Peabody LLP

(57) ABSTRACT

The present invention relates to an industrial scale filtration assembly for filtrating a liquid and screening of foreign particles and dirtiness. More particularly the invention pertains to a self-cleaning filtration assembly for gradually screening of fine and coarse particles in a single system by using different filtration screens (2, 4) concentrically formed in a single filter body (13).

17 Claims, 6 Drawing Sheets

(56) References Cited

FOREIGN PATENT DOCUMENTS

| | | |
|---|---|---|
| EP | 1785178 A1 | 5/2007 |
| EP | 2325081 A2 | 5/2011 |
| EP | 2527021 A1 | 11/2012 |
| KR | 20130063563 | 6/2013 |
| WO | WO 2006/080653 A1 | 8/2006 |
| WO | WO 2015/130253 A1 | 9/2015 |

OTHER PUBLICATIONS

Written Opinion of the International Searching Authority, PCT/TR2015/000079, date of mailing Aug. 14, 2015 (5 pages).
International Preliminary Report on Patentability, PCT/TR2015/000079, date of mailing Feb. 5, 2016 (12 pages).

FILTRATION ASSEMBLY FOR GRADUALLY SCREENING OF FINE AND COARSE PARTICLES IN A SINGLE OPERATIONAL UNIT

CROSS-REFERENCE TO RELATED APPLICATIONS

This application is a U.S. National Stage of International Application No. PCT/TR2015/000079, filed Feb. 27, 2015, which designated the U.S. and which claims the benefits of and priority to foreign Turkish Patent Application No. 2014/02379, filed Feb. 28, 2014, the contents of each of which are hereby incorporated by reference herein in their entireties.

TECHNICAL FIELD OF THE INVENTION

The present invention relates to an industrial scale filtration assembly for filtrating a liquid and screening of foreign particles and dirtiness. More particularly the invention pertains to a self-cleaning filtration assembly for gradually screening of fine and coarse particles in a single system.

BACKGROUND OF THE INVENTION

Filtration assemblies of the industrial type find usage in wide range of application areas including irrigation, cooling towers, fish farms, power generation plants, sea water treatment systems, steel industry, ships, and other areas supplying any liquid from a source to a system such as supplying of water from a source for industrial or domestic use. These filters mostly accommodate a rigid hollow filter inside a tubular body which normally suffers of clogging problems after a certain time of operation due to the small particles and larger substances coming through the liquid. Therefore, these filters are expected to clean themselves periodically according to predetermined parameters such as pressure drop through the filter, or otherwise are cleaned manually by labour which is cumbersome and not feasible in the plants of industrial scale.

Therefore, there are proposed various types of filters in prior art for screening of the micro- and macro-particles from a stream of liquid. EP-A-2 325 081, for instance, discloses a ballast water treatment device including a filtering unit of the above type for treatment of the ballasting water used in the ships. The filtering unit comprises a filter in a filter body which is equipped with an automatic washing unit with plurality of nozzles. In this system, said washing unit is located within the inner volume defined by the tubular filter and is activated by the sensors depending on the pressure drop caused by clogging of the filter surface. This system, however has drawbacks in many aspects such that the nozzles have the very limited capacity to suck and remove coarse particles and substances such as fishes, algae and wastes. More importantly, these kind of screening systems are not sufficient for filtering out both the fine and coarse particles within the very same system, and therefore require additional installations such as additional filtering units designed for the purpose of non-filtrated substances.

A further arrangement disclosed in document KR-A-20130063563 suggests a filtering unit working with the reverse principles such that liquid is filtered from outside through the inner volume of cylindrical filter whereby scratching devices with water jets are provided upon the filter. Thereby the dirtiness accumulated on peripheral surface of the filter is scratched with the help of pressurized water sprayed on the filter in a cleaning cycle. This system is again non-responsive to the drawbacks mentioned above, and is also complicated and disadvantageous because the scratching tools may deteriorate the filter surface.

DE-C-935 424 discloses a filter device enabling back washing, comprising two concentrically formed filters of unknown screen openings whereby the outer screen is arranged rotatable while the inner screen is fixedly placed, but is optionally arranged as liftable. Cleaning of the filter screens is carried out by using arrays of nozzles (h1, h2) applying pressurized liquid or gas, and removal of the dirtiness from the filter surfaces is carried out through a valve (k) and manifold (g) with the help of gravity.

As shown with the pertinent prior art scrutinized above, the conventional filters are designed for a particular mode of screening for a targeted range of particles or substances, and do not allow to carry out a second mode of screening for particles of a different magnitude. The importance of filtering in different modes gains importance in recent years because of the increased pollution in water sources and sea. To solve these problems, the conventional approach is to use different filtering units in series accommodating filters of different types for separately filtering out small and larger particles. This approach not only increases the costs and complexity of the overall system but is also disadvantageous in other aspects such that the liquid coming from the outlet of one filtering unit needs then be directed to the other filtering unit possibly with at least one 90° elbow conduit which affects the energy consumption for pumping of the liquid in the system because of the increased head loss. Adding onto this, the energy consumption associated with the second filtering unit, the overall operational costs dramatically increase in the conventional systems.

Therefore, an object of the present invention is to provide a filtration assembly which is capable of carrying out two different modes of screening for small and larger particles in situ.

Another object of the present invention is to decrease installation requirements for gradual filtration of fine and coarse particles in a filtration system.

Still a further object of the present invention is to provide a filtration assembly which has reduced costs and energy consumption as well as reduced head loss as compared to the state of the art filtering systems using of different filtering units for different modes of screening.

These and other objects of the present invention are achieved through the novel filtration system as disclosed in the appended claims.

SUMMARY OF THE INVENTION

The present invention provides a novel filtration assembly for gradually screening of coarse and fine particles in a stream of liquid. This assembly comprises a filter body (13); comprising an inlet (1) and outlet (5), a cylindrical coarse filtration screen (2) having screen openings (Sc), a diameter (dc) and a first filtration volume (21), and a cylindrical fine filtration screen (4) having screen openings (Sf) smaller than those of the coarse filtration screen (2) and a diameter (df) larger than that of the coarse filtration screen (2). Said coarse and fine filtration screens (2, 4) are concentrically placed into the filter body (13) to define a second filtration volume (3) therebetween, such that only the liquid filtrated through the coarse filtration screen (2) can be passing to said second filtration volume (3).

The filtration assembly of the present invention comprises also an upper discharge unit (20) comprising a coarse filtration drainage housing (11) in fluid communication with the first filtration volume (21) and a fine filtration drainage housing (12) in fluid communication with the second volume (3) wherein said coarse and fine filtration drainage housings (11, 12) are equipped with corresponding discharge valves (9, 9').

The assembly of the present invention further comprises a cleaning means (14) comprising a main collection arm (16) extending through the first volume (21) and at least one lateral arm (22) at least one end of which is connected to said main collection arm (16) and extending through the second volume (3) in between the filtration screens (2, 4), whereby the fluid communication of said second volume (3) and the fine filtration drainage housing (12) is provided by said lateral arm (22).

In preferred embodiments, the upper discharge unit (20) comprises a motor (6) providing rotation of the cleaning means (14) such that the main collection arm (16) axially rotates in the first volume (21) and the lateral arm (22) radially rotates in the second volume (3). Said main collection arm (16) may comprise a plurality of brushes (8) or nozzles (10), or a combination thereof for cleaning of the inner surface of the coarse filtration screen (2). The lateral arm (22) on the other hand comprises a plurality of nozzles (10) or a combination of nozzles (10) and brushes (8) for cleaning of the inner surface of the fine filtration screen (2) and sucking of filtrated particles in the second volume (3) into the fine filtration drainage housing (12).

The upper discharge unit (20) preferably comprises a reducer (7) transmitting the movement of the motor (6) to the cleaning means (14) which can also be configured to provide a helical movement of the cleaning means (14) by way of rotational and vertical movement simultaneously.

In further embodiments of the present invention the assembly further comprises a control unit for activation of said motor (6) and a plurality of sensors in the said inlet (1) and outlet (5) such that the motor (6) is activated based on a pressure difference ($\Delta P$) at the inlet (1) and outlet (5) as measured by the sensors. That is the control unit produces a control signal at a pressure difference ($\Delta P$) exceeding a predetermined level of pressure difference ($\Delta P$). The control unit may further be combined with a timer for activation of the motor (6) after a predetermined time interval. The control unit may be configured to open the valve (9) for discharging of the coarse particles within the first volume (21) and subsequently to activate the valve (9') for discharging of the fine particles within the second volume (3).

The nozzles (10) as provided in the present invention may comprise at least one conical inner tubing, larger end of which is arranged in close proximity of the filtration screens (2, 4). The brushes (8) on the other hand may comprise a brush nest (18) and a number of adjustment pins (17) for adjusting abutment of the brushes (8) onto to the screen surfaces.

In further aspects the present invention pertains to a method for gradually screening of coarse and fine particles in a stream of liquid, comprising the steps;
  providing a filtration assembly comprising filter body (13) and an upper discharge unit (20); said filter body (13) comprising a cylindrical fine filtration screen (4) and a cylindrical coarse filtration screen (2) having a first filtration volume (21) and being concentrically placed into the inner volume of said fine filtration screen (4) to form a second filtration volume (3) therebetween; and said upper discharge unit (20) comprising a coarse filtration drainage housing (11) in fluid communication with the first filtration volume (21) and a fine filtration drainage housing (12) in fluid communication with the second volume (3), said coarse and fine filtration drainage housings (11, 12) being equipped with corresponding discharge valves (9, 9'); and a cleaning means (14) comprising a main collection arm (16) extending through the first volume (21) and at least one lateral arm (22) at least one end of which is connected to said main collection arm (16) and extending through the second volume (3) in between the filtration screens (2, 4),
  supplying of a liquid having a pressure higher than atmospheric pressure to the first filtration volume (21) and filtrating the coarse particles through the coarse filtration screen (2) in a first filtration mode,
  filtering the initially filtrated liquid passing to the second volume (3) through the fine filtration screen (4) in a second filtration mode so that completely filtered liquid to be discharged through an outlet (5),
  rotating the cleaning means (14) for cleaning up inner surfaces of the screens (2, 4),
  opening the discharge valve (9) and discharging the coarse particles through the coarse filtration drainage housing (11),
  opening the discharge valve (9'), sucking the fine particles by means of the lateral arm (22) and discharging the same through the fine filtration drainage housing (12).

DETAILED DESCRIPTION OF THE INVENTION

The present invention solves aforesaid problems of prior art with a novel filtration assembly comprising a filter body (13) and an upper discharge unit (20) for automatically filtering out fine and coarse particles of a liquid within the same system. The filter body (13) comprises an inlet (1) where the liquid to be filtered enters into the filtration assembly, and an outlet (5) for supplying the filtrated liquid to the relevant system.

Figure 1:
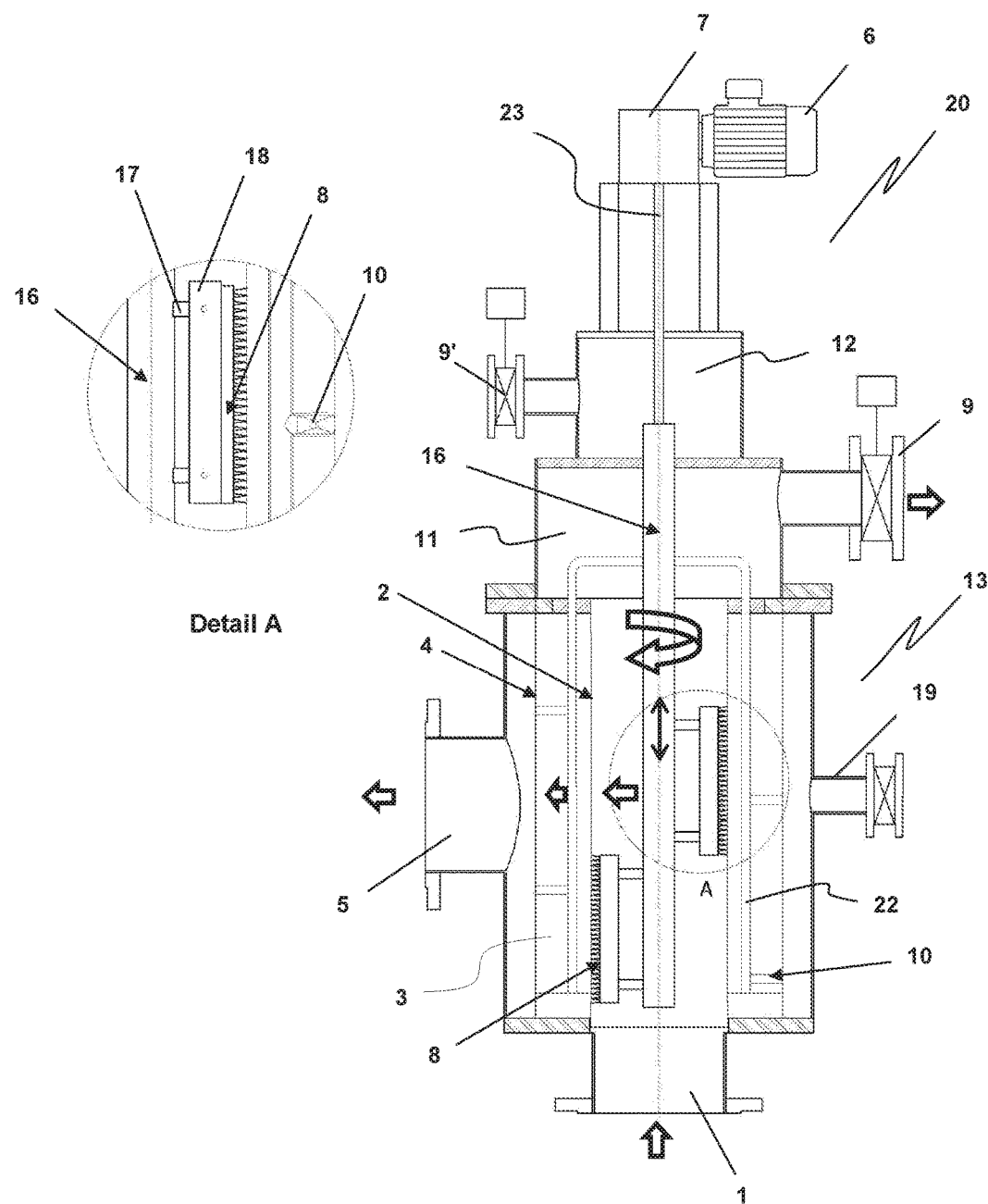
FIG. 1 shows a detailed cross sectional view of the filtration assembly according to an embodiment of the present invention. Detail A shows a close up of the brushes including a brush nest and pins.
Figure 3:
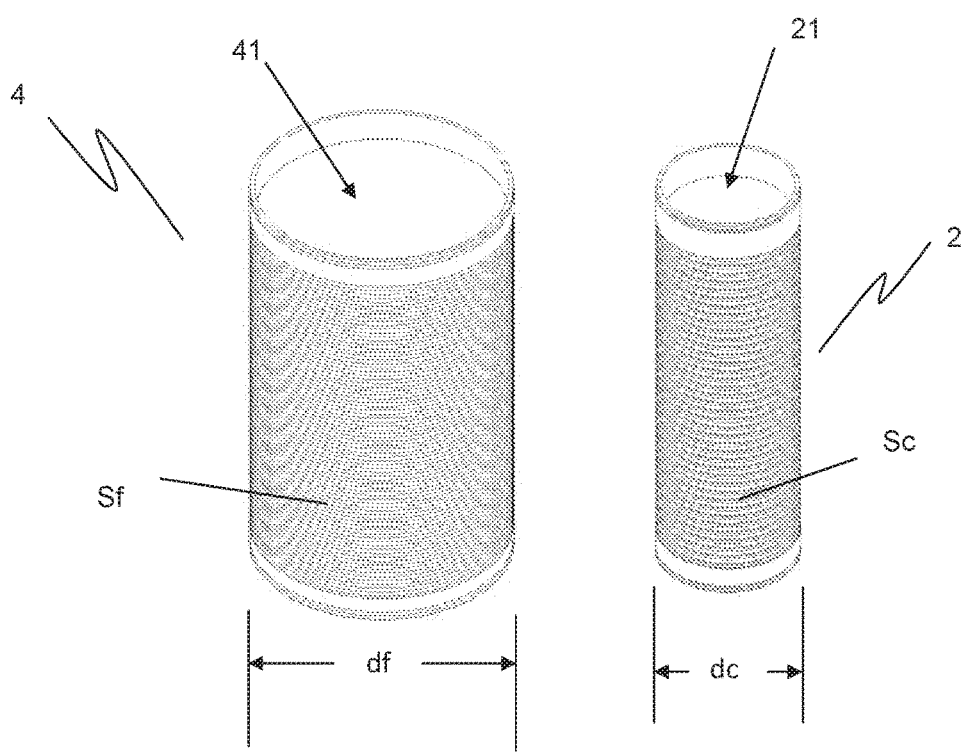
FIG. 3 shows perspective view of the filtration screens used in the filtration assembly of the present invention.

Referring now to FIG. 1 showing a cross-sectional view of the filtration assembly according to the present invention, there are provided two filter screens (2, 4) perspective views of which are shown in FIG. 3. The coarse filtration screen (2) and the fine filtration screen (4) that are cylindrical in shape are formed with different diameters and screen openings. The coarse filtration screen (2) has a hollow body defining a first filtration volume (21) and has a diameter ($d_c$) that is less than the diameter of the fine filtration screen ($d_f$) so that these filtration screens would be concentrically nested within each other. That is the coarse filtration screen (2) is placed into the inner volume (41) defined by the hollow fine filtration screen (4) in such a way that a second filtration volume (3) is formed within the interspacing of the concentrically placed filtration screens (2, 4). The coarse filtration screen (2) has the screen openings (Sc) larger than those (Sf) of the fine filtration screen (4) for gradual filtration of a liquid according to the objectives of the instant invention.

According to an aspect of the present invention the inner volume (21) of said coarse filtration screen (2) is arranged in fluid communication with the liquid inlet (1) such that the incoming liquid directly flows into this volume (21) to carry out a first filtration mode for filtering out larger particles and substances ranging from macro-particles to larger substances such as wastes and spoils. Therefore, the said inner volume (21) is longitudinally arranged in vertical direction that is the same direction of flow of the liquid coming through the inlet (1) as shown in FIG. 1. Thereby, the liquid passes through the coarse filtration screen (2) into the second filtration volume (3) defined in between said coarse and fine filtration screens (2, 4). It has to be noted that this second volume (3) has no direct fluid communication with the inlet (1) and therefore it is the liquid filling this volume (3) only coming from the first volume (21) after the first mode of filtration.

The liquid entering into this second volume (3) is subsequently forced to pass through the screen openings of the fine filtration screen (Sf) which are smaller than the screen openings of the coarse filtration screen (Sc). It is therefore ensured that smaller particles be filtrated in a second mode of filtration and the clean liquid to leave the system through the outlet (5).

The sizes of the filtration screens (Sf, Sc) can be arranged depending on the characteristics of the liquid and pollution/undesired material level thereof. In other words the pollutants and their varieties determine the optimization criteria of the said openings. In a filtration process of sea water, for instance, there may be pollutants of larger in dimension within a first spectrum down to 10 mm such as mussels, plant materials and even fishes, and smaller particles within a second spectrum down to 50 microns such as sand, silt and algae. In such an area, the screen openings (Sc, Sf) of the coarse and fine filtration screens (2, 4) may well be arranged in consideration with the sizes of the pollutants and undesired substances as mentioned above.

The filtration screens (2, 4) used in the context of the present invention are well known to those skilled in the art, and are generally made of meshes of materials including stainless steel, carbon steel, PVC and different ferritic materials etc. The filtration screens are generally exposed to high levels of liquid pressure inside the filter body (13), and deterioration of their perfectly cylindrical shape may seriously affect the their functionality and back-flush cleaning process. Therefore the material of the filtration screens (2, 4) is preferably selected to have an endurance against a pressure ranging for instance from 10 to 16 bars. To this end, stainless steel series is the preferred material for the production of the filtration screens (2, 4) according to the present invention.

It is also known in the art that the filtration screens can be produced with different techniques which affect the size and functionality of the openings (Sc, Sf) belonging to the filtration screens (2, 4). Screens with slot type openings may for instance be provided with an opening size ranging from 2 mm to 5 mm, and this can be useful for filtration of coarse substances such as branches, leaves, plastic bags and mussels in a stream of liquid. Another type of the filter material is named as wedge wire which can well be formed with openings of 400 to 2000 microns that can be suitable for filtrating macroorganisms, small stones etc. The weave wire type screens, on the other hand are suitable to be formed with very small openings ranging from 5 to 300 microns. The size of the openings should be optimized according to the particular requirements of the system using of the liquid. Selection of a screen openings smaller than needed may for instance cause undue increase in consumption of energy and costs of the filtration system, and selection of larger openings would render the filtration system non-responsive to the particular requirements.

Figure 6:
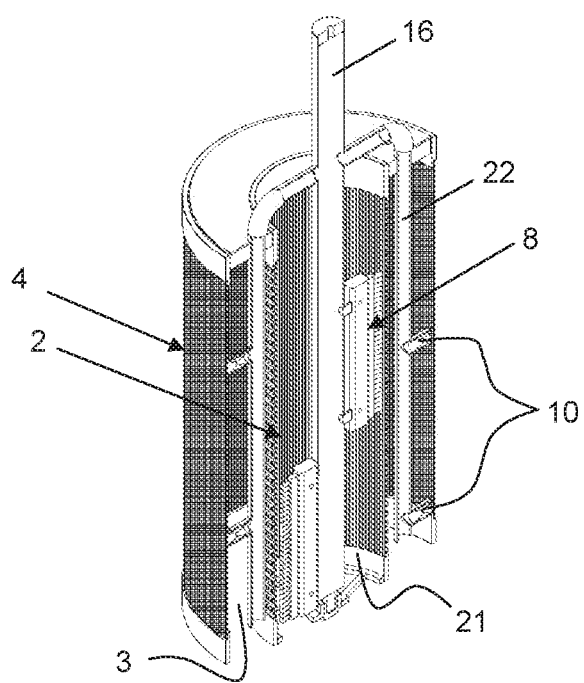
FIG. 6 is a perspective view of the cross-section belonging to concentrically formed filters equipped with a cleaning means according to an embodiment of the present invention.

The filter body (13) as provided herein further comprises a cleaning means (14) for cleaning the corresponding surfaces of the filtration screens (2, 4) where dirtiness is accumulated. As shown in detail within FIGS. 4a and 4b as well as in FIG. 6, said cleaning means (14) is provided with a main collector arm (16) that is operational within the internal volume (21) of the coarse filtration screen (2), and lateral arms (22) operational within the second filtration volume (3) that is in the interspacing of the filtration screens (2, 4). The main collector arm (16) lying vertically along the first volume (21) mentioned above extends through the upper discharge unit (20) by which it is operated. The lateral arms (22) on the other hand are arranged in parallel with the main collector arm (16), and are connected from one end to the said collector arm (16) to form a bifurcated structure. Said cleaning means (14) is equipped with a number of nozzles (10) and brushes (8) where each of the nozzles (10) exerts vacuum to suck and remove the dirtiness in corresponding volumes (3, 21) while the brushes (8) serve to sweep up the dirtiness stuck on the corresponding filtration screen. It is especially preferable to use brushes (8) where the dirtiness to be removed involves coarse particles and larger substances that would not be easily sucked by the nozzles (10).

Figure 4A:
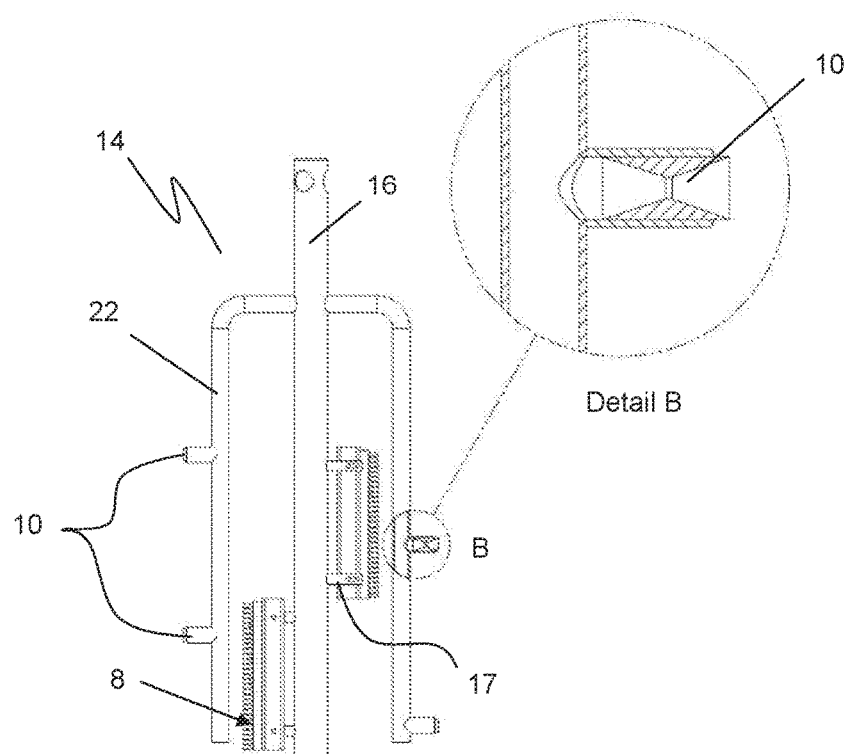
FIGS. 4a and 4b show the cleaning apparatus comprising brushes and nozzles according to different embodiments of the present invention. Detail B shows a close up of the nozzle design.

In a preferred embodiment of the present invention as shown in FIG. 4a which is also shown within the assembly of FIG. 1, the main collector arm (16) of the cleaning means (14) comprises plurality of brushes (8) to sweep and raise up the dirtiness accumulated in the first volume (21) of the coarse filtration screen (2). The lateral arms (22), on the other hand, are equipped with a plurality of nozzles (10) to suck and remove fine particles accumulated on the inner surface of the fine filtration screen (4). In this embodiment, therefore, the lateral arms (22) and at least part of the main collection arm (16) are formed as a conduit for exertion of a vacuum through the nozzles (10).

Figure 4B:
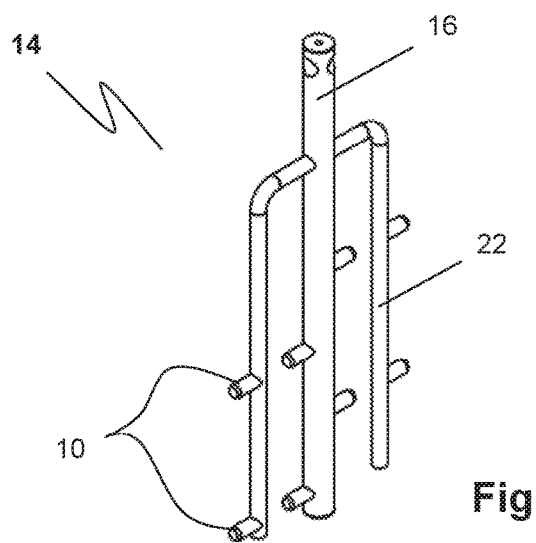
Figure 5:
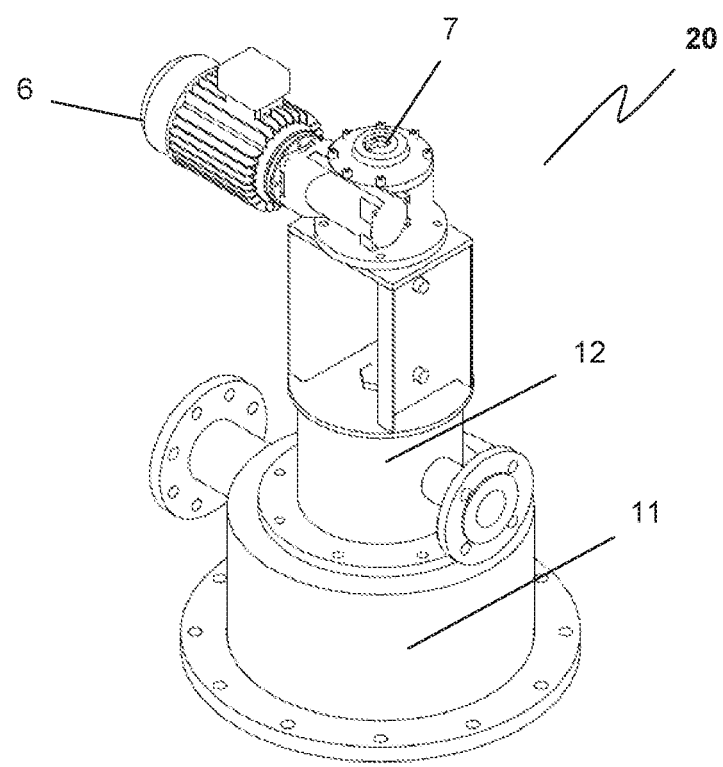
FIG. 5 shows a perspective view of the upper control unit of the filtration assembly according to the present invention.

In another preferred embodiment of the present invention as shown in FIG. 4b, both of said main collector arm (16) and the lateral arms (22) can be equipped with plurality of nozzles (10). In this case, both the main collector arm (16) and the lateral arms (22) can be formed as a conduit in fluid communication with the corresponding filtration volumes within the filter body (13).

Although in the lateral arms (22) in aforementioned embodiments are provided only the nozzles (10) to suck and remove the dirtiness, there may be brushes (8) in combination with the nozzles (10) depending on the system requirements of the filtration assembly. It should further be noted that the main collector arm (16) may similarly be equipped with a combination of nozzles (10) and brushes (8) for carrying out the objectives of the present invention.

The nozzles (10) used in the context of the present invention have a special design to suck and remove the dirtiness with a conical shaped tubing where their mouth openings widens through the end thereof such that larger ends thereof are arranged in close proximity of the filtration screens (2, 4) as shown in Detail-B of FIG. 4a. By this way, the pollutants are easily sucked through the nozzles (10) with high flow rate without substantially encountering size limitations by virtue of their enlarged ending sections. The brushes (8) on the other hand can advantageously be equipped with a brush nest (18) and a number of adjustment pins (17) as shown in the Detail-A of FIG. 1. These adjustment pins enables perfect abutment of the brushes (8) onto to the screen surface which is very important for satisfactory cleaning of the screen surfaces.

In a further aspect of the present invention, there is provided an upper discharge unit (20) that is fixedly mounted onto the filter body (13) by way of, for instance, a flange connection. Said upper discharge unit (20) comprises a motor (6) and a reducer (7) that transmits motion of the motor (6) to the cleaning means (14) through a shaft (23) longitudinally extending in vertical direction. The upper discharge unit (20) comprises a coarse filtration drainage housing (11) and a fine filtration drainage housing (12) separately arranged in the upper discharge unit (20). In preferred embodiments, the coarse filtration drainage housing (11) is directly arranged in the bottom end of the upper discharge unit (20) such that this housing (11) has a direct fluid communication with inner volume (21) of the coarse filtration screen (2). Said housing (11) comprises a valve (9) which can be opened to atmosphere in order to discharge the coarse residue coming through the inner volume of the coarse filtration screen (2).

The fine filtration drainage housing (12), on the other hand is preferably located on top of the coarse filtration drainage housing (11) and is in fluid communication with the second volume (3) defined in between the filters (2, 4) through the main collector arm (16) and the lateral arms (22) of the cleaning means (14). As mentioned above, said second volume (3) includes the liquid already filtrated through the coarse filtration screen (2) and therefore, the coarse particles or substances having a size larger than the openings (Sc) of the coarse filtration screen (2) are not allowed to enter this fine filtration drainage housing (12). The latter is again equipped with a valve (9') which can be open to atmosphere for drainage of the fine particles entrapped with the second volume (3) as well as the particles accumulated on the inner surface of the fine filtration screen (4). Because the internal pressure of the filter body (13) generally exceeds the atmospheric pressure no vacuuming means would be required for creating a vacuum through the nozzles (19) or any equivalent openings for sucking the particles.

In a further aspect of the present invention, the cleaning process of the screens (2, 4) is automatized via a control unit (not shown) which can be operated via pressure measurements, time measurements or both. The clogging of the filters (2, 4) in the filter body (13) creates a pressure drop ($\Delta P$) that is the difference of the pressure at the inlet (1) and outlet (5) of the filter body (13), and therefore a plurality of sensors can be accommodated in the system for measuring the pressure drop ($\Delta P$) in order to produce an electrical signal that is to be processed by the control unit which produces a control signal for activation of the motor (6), and thereby initiates a cleaning cycle (back-flushing). The control unit may also produce control signals by way of a timer which activates the motor (6) in predetermined time intervals.

Figure 2:
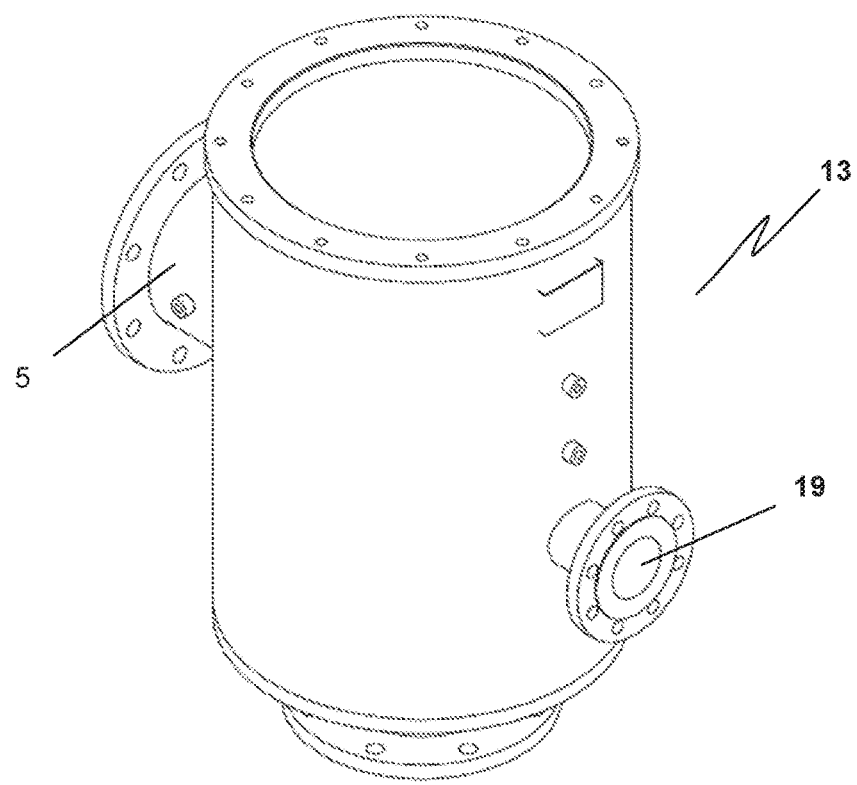
FIG. 2 is a perspective view of the filter body according to the present invention.

The filtration assembly of the present invention may further comprise a clean water connection (19) on the filter body (13) as shown in FIGS. 1 and 2, for use in exceptional cases where the filters are clogged with non-removable particles and substances. In order to avoid cumbersome procedures of dismantling the filter components, supplying pressurized clean water in reverse direction to the filtration screens (2, 4) would be an effective way and the cleaning effect can even be boosted by operating the cleaning means (14) and especially nozzles (10) at the same time. Therefore, the control unit used in the context of the present invention can be integrated with supply of a clean water which may involve activation of a valve disposed on the said clean water connection (19).

In a further aspect of the present invention, there is provided a method of gradual filtration of a liquid. In said method, there are provided a coarse filtration screen (2) having screen openings (Sc) and a cross-sectional diameter (dc), and a fine filtration screen (4) having screen openings (Sf) smaller than the screen openings (Sc), and a diameter (df) larger than the diameter (dc) of said coarse filtration screen (2) whereby said filtration screens (2, 4) are concentrically formed in the same axis. The method comprises the steps of allowing a pressurized liquid to enter through an inlet (1) and be filtrated via said coarse filtrations screen (2) in a first filtration mode, subsequently filtrating the liquid through the fine filtration screen (4) in a second filtration mode, and the gradually filtrated liquid thereby passes through the volume between the fine filtration screen (4) and the wall of filter body (13) before it is discharged through an outlet (5). The method further comprises applying a cleaning cycle by activation of a cleaning means (14) for cleaning and removing coarse and fine particles separately through respective valves (9, 9'). The first valve (9) in fluid communication with the coarse filtration drainage housing (11) is opened, and thereby a vacuum is created to discharge the coarse particles and substances remaining in the inner volume (21) of the coarse filtration screen (2). The second valve (9') can be then opened to suck the fine particles remaining in the second volume (3) into a fine filtration drainage housing (12) and removed through said second valve (9'). As noted in preferred embodiments, the cleaning means (14) has its corresponding arms (16, 22) extending vertically through said volumes (21, 3) for sweeping and raising up dirtiness accumulated therein, and can be equipped with nozzles (10), brushes (8) or a combination thereof. The nozzles (10) are preferably disposed to have the function of sucking and carrying of the fine particulates to the fine filtration drainage housing (12). Therefore, in preferred embodiments, the method of the present invention comprises activation of the motor (6) based on the pressure difference ($\Delta P$) of the inlet (1) and outlet (5) of the filter body (13), axially moving the cleaning means (14) until the pressure difference reaches to a predetermined level, and activating the discharge valves (9, 9') either sequentially or simultaneously. In this back-flush cycle, filtrates of different nature are advantageously discharged separately. Preferably, the filtration continues during the back-flush cycle.

Further aspects and advantages of the present invention shall be obvious for those skilled in the art in view of the appended claims and drawings.

The invention claimed is:

1. A filtration assembly for gradually screening coarse and fine particles from a flowing liquid, the assembly comprising:
   a filter body comprising (i) an inlet and outlet, (ii) a cylindrical coarse filtration screen having first screen openings, a first diameter and a first filtration volume, and (iii) a cylindrical fine filtration screen having second screen openings smaller than those of the coarse filtration screen and a second diameter larger than that of the coarse filtration screen, said coarse and fine filtration screens being concentrically placed into the filter body to define a second filtration volume therebetween, such that only the liquid filtered through the coarse filtration screen can be passing to said second filtration volume;

an upper discharge unit comprising a coarse filtration drainage housing in fluid communication with the first filtration volume and a fine filtration drainage housing in fluid communication with the second filtration volume, said coarse and fine filtration drainage housings being equipped with corresponding discharge valves; and a cleaning means comprising a main collection arm extending through the first filtration volume and at least one lateral arm at least one end of which is connected to said main collection arm and extending through the second filtration volume in between the filtration screens, whereby the fluid communication between said second volume and the fine filtration drainage housing is provided by said at least one lateral arm.

2. A filtration assembly according to claim 1 wherein the upper discharge unit comprises a motor providing rotation of the cleaning means such that the main collection arm axially rotates in the first filtration volume and the lateral arm radially rotates in the second filtration volume.

3. A filtration assembly according to claim 2 wherein the motor provides a helical movement of the cleaning means by way of simultaneous rotational and vertical movement.

4. A filtration assembly according to claim 1 wherein said main collection arm comprises plurality of brushes or nozzles 1 or a combination thereof, for cleaning an inner surface of the coarse filtration screen.

5. A filtration assembly according to claim 4 wherein the nozzles comprise at least one conical inner tubing larger end arranged in close proximity to the coarse filtration screen.

6. A filtration assembly according to claim 4 wherein each of the brushes comprises a brush nest and a plurality of adjustment pins for adjusting an abutment of the brushes onto a screen surface.

7. A filtration assembly according to claim 1 wherein said lateral arm comprises a plurality of nozzles, or a combination of nozzles and brushes, for cleaning an inner surface of the fine filtration screen and sucking filtered particles remaining in the second volume into the fine filtration drainage housing.

8. A filtration assembly according to claim 7 wherein the nozzles comprise at least one conical inner tubing including a larger end disposed in close proximity to the fine filtration screen.

9. A filtration assembly according to claim 7 wherein each of the brushes comprises a brush nest and one or more adjustment pins for adjusting an abutment of the brushes onto to the screen surfaces.

10. A filtration assembly according to claim 1 wherein said assembly further comprises a control unit for activation of a motor and a plurality of sensors in the inlet and outlet such that the motor is activated based on a pressure difference at the inlet and outlet, as measured by the sensors, exceeding a predetermined level of pressure difference, and/or based on a timer producing electrical signals after a predetermined time interval.

11. A filtration assembly according to claim 10 wherein the control unit is configured to open the discharge valve of the coarse filtration drainage housing for discharging of the coarse particles within the first filtration volume and subsequently to activate the discharge valve of the fine filtration drainage housing for discharging of the fine particles within the second filtration volume.

12. A filtration assembly according to claim 1 wherein the filter body further comprises a clean water connection section.

13. A filtration assembly according to claim 1 configured to supply filtered water for irrigation systems, cooling towers, fish farms, power generation plants, sea water treatment systems, steel production facilities, or ships.

14. A method for gradually screening coarse and fine particles suspended in a flowing liquid, comprising the steps:

providing a filtration assembly comprising filter body and an upper discharge unit, said filter body comprising a cylindrical fine filtration screen and a cylindrical coarse filtration screen having a first filtration volume and being concentrically placed into an inner volume of said fine filtration screen to form a second filtration volume therebetween, said upper discharge unit comprising a coarse filtration drainage housing in fluid communication with the first filtration volume and a fine filtration drainage housing in fluid communication with the second filtration volume, said coarse and fine filtration drainage housings being equipped with corresponding discharge valves;

providing a cleaning means comprising a main collection arm extending through the first volume and at least one lateral arm at least one end of which is connected to said main collection arm and extending through the second filtration volume in between the coarse filtration screen and the fine filtration screen;

supplying a liquid at a pressure higher than atmospheric pressure to the first filtration volume and filtering the coarse particles through the coarse filtration screen in a first filtration mode;

filtering the initially filtered liquid from the first filtration mode by passing the initially filtered liquid to the second volume through the fine filtration screen in a second filtration mode such that the filtered liquid from the second filtration mode is ready to be discharged through an outlet;

rotating the cleaning means for cleaning up inner surfaces of the screens;

opening the discharge valve of the coarse filtration drainage housing and discharging the coarse particles through the coarse filtration drainage housing;

opening the discharge valve of the fine filtration drainage housing and sucking the fine particles by means of the lateral arm; and discharging the fine particles through the fine filtration drainage housing.

15. A method according to claim 14 wherein said main collection arm comprises a plurality of brushes or nozzles or a combination thereof, for cleaning of an inner surface of the coarse filtration screen.

16. A method according to claim 14 wherein opening of the discharge valves and rotation of the cleaning means is activated based on a pressure difference between the inlet and outlet, on a predetermined time interval, or both.

17. A method according to claim 14 wherein the method further comprises providing a helical movement of the cleaning means on inner surfaces of the screens.

* * * * *